2,921,887
Patented Jan. 19, 1960

2,921,887

PROCESS FOR THE PRODUCTION OF COBALAMINS

Fred W. Tanner, Jr., Baldwin, N.Y., assignor to Chas. Pfizer & Co., Inc., Brooklyn, N.Y., a corporation of Delaware No Drawing. Application December 8, 1958
Serial No. 778,563

5 Claims. (Cl. 195—81)

This invention relates to the production of cobalamins by fermentation methods. More particularly, it is concerned with a process for the production of substances having vitamin $B_{12}$-activity by means of a microorganism belonging to the class of Fungi Imperfecti.

It has now been generally accepted that substances having vitamin $B_{12}$-activity, such as the cobalamins, are identical with the antipernicious anemia factor first reported as being present in whole liver. This factor is of vital interest from both the medicinal and nutritional points of view with respect to many types of anemias inasmuch as it is concerned with the formation, maturation and regeneration of red blood cells. Incidentally, food material of animal origin, such as meat, fish, milk, eggs, etc., represent the principal sources of naturally occurring vitamin $B_{12}$-activity, while materials of plant origin exhibit little or no such activity.

It has been known for some time that this factor appears to be required for a normal growth pattern. Extensive tests with chickens, hogs and other animals have shown that they require vitamin $B_{12}$ for normal growth and that it is identical with the so-called animal protein factor. Furthermore, improved growth and increased appetites have resulted from the oral administration of vitamin $B_{12}$ to children with retarded growth. Hence, it is obvious that this factor is of physiological significance and that a convenient method for preparing substances identical with this factor would be of tremendous economic importance to the public in general and to the pharmaceutical industry in particular.

As previously indicated, it has been the practice to furnish vitamin $B_{12}$-active supplements in the form of meat by-products, fish solubles, fish meal, liver meal, and the like. However, these materials are either expensive or in relatively short supply in addition to having the further disadvantage of containing only comparatively small and varying amounts of the animal protein factor. Accordingly, a primary object of the present invention is to provide a convenient method for the preparation of this important vitaminaceous supplement in a concentrated form and in a relatively inexpensive manner. Other objects and advantages of this invention will be apparent to those skilled in the art from the description which follows.

It has now been discovered that substances having vitamin $B_{12}$-activity, such as the cobalamins, can be prepared by fermenting an aqueous nutrient medium by means of a microorganism belonging to the class of Fungi Imperfecti, whereby the aforementioned disadvantages are overcome and the objects of this invention are readily accomplished. In particular, this process comprises fermenting an aqueous nutrient medium under submerged aerobic conditions by means of a microorganism selected from the group consisting of vitamin $B_{12}$-activity producing microorganisms of the genus Penicillium so as to impart a substantial degree of vitamin $B_{12}$-activity to said medium.

Moreover, it has been discovered that these vitamin $B_{12}$-activity producing microorganisms of the genus Penicillium, and preferably those of the species Penicillium lilacinum, are capable of synthesizing vitamin $B_{12}$ and/or vitamin $B_{12}$-active substances, such as the various cobalamins, in substantial yields. In this connection, it has been found that when a vitamin $B_{12}$-activity producing microorganism of P. lilacinum is propagated on an aqueous nutrient medium and the fermentation broth is then subjected to a recovery and isolation procedure, various cobalamins having vitamin $B_{12}$-activity are obtained therefrom.

It is to be understood that when the term cobalamin is used throughout this specification it is meant to include all the various closely-related neutral coordination complexes containing cobalt which exhibit vitamin $B_{12}$-activity. It is now known that vitamin $B_{12}$ (cyanocobalamin) is only one member of this group of closely related compounds; this vitamin possesses a nitrile function which is bound so tightly in the molecule, i.e., highly coordinated, that it does not exhibit the properties of the cyanide ion, e.g., it shows no signs of toxicity when injected into mice. Other members of this group which have been identified only differ from the parent compound in that a different negative group is substituted in place of the cyanide moiety of the vitamin $B_{12}$-molecule. For instance, when the cyano group is replaced by the hydroxyl group, the resulting hydroxycobalamin is called vitamin $B_{12a}$. Other negative groups, such as the halogens, can also be easily substituted in the cobalamin moiety and this, in turn, serves to provide a basis for naming vitamin $B_{12}$ and its analogs. Thus, the name cobalamin actually refers to the entire molecule except for the highly coordinated negative group, such as cyano, hydroxyl, chloro, bromo, and the like, whichever the case may be.

In accordance with the process of this invention, an aqueous nutrient medium is fermented under submerged aerobic conditions by means of a vitamin $B_{12}$-activity producing microorganism of the species Penicillium lilacinum. It is to be noted that the genus Penicillium is a member of the Moniliaceal family which belongs to the order Moniliales of the class designated as Fungi Imperfecti, the latter class being a division of the Fungi subphylum. Of particular value for the herein described fermentative method is a strain of microorganism designated as Penicillium lilacinum ATCC 13307; cultures thereof are available in several public culture collections such as, for example, the Centraalbureau voor Schimmelcultur located at Baarn in The Netherlands (as Penicillium lilacinum Thom). Still other microorganisms of this same species may be isolated from natural materials, such as soil, by standard procedures well known to mycologists. It is to be understood that the present invention includes any new variants of vitamin $B_{12}$-producing microorganisms of the species, as well as any mutants produced from the aforementioned species by various means, such as X-radiation, ultraviolet radiation, ultrasonic vibration, nitrogen mustards, and the like. Furthermore, there is also included within the scope of this invention any mutants or forms of P. lilacinum that are developed by such techniques as those described by L. S. Olive [American Journal of Botany, vol. 43, Issue No. 2, pp. 97–106 (1956)] and G. Pontecorvo [Advances in Genetics, vol. 5, pp. 141–238 (1953)], as well as any other vitamin $B_{12}$-activity producing microorganisms of this species which are currently unidentified as to their strain.

In carrying out the process of this invention, it has been found desirable to employ cultures which are grown in or on a medium favorable to their development. In this connection, it is to be noted that although solid media may be utilized, liquid media are preferred for mycelial growth under aerobic conditions; for instance, such liquid media as brewer's wort are well adapted to use under submerged aerobic fermentation conditions. For these purposes, it is necessary that the media contain suitable sources of available carbon, nitrogen and minerals so as to facilitate substantial growth of the microorganism under optimum conditions. Available carbon may be obtained from such sources as proteins, amino acids, carbohydrates, starches, dextrin, molasses and sugars, including glucose, fructose, mannose, galactose, maltose, sucrose, lactose, various pentoses and cerelose, while carbon dioxide, glycerol, alcohols, acetic acid, sodium acetate, etc., are illustrative of other materials which provide assimilable carbon for the energy requirements of these microorganisms; in this regard, mixtures of various carbon sources are sometimes advantageous. Nitrogen may be provided in assimilable form from such suitable sources as soluble or insoluble animal and vegetable proteins, soybean meal, lactalbumin, casein, egg albumin, peptones, polypeptides or amino acids, urea, ammonium salts and sodium or potassium nitrate; furthermore, whey, distillers' solubles, corn steep liquor and yeast extract have also been found to be useful. Among the mineral constituents which the media may contain, either naturally present or added, are available calcium, chromium, cobalt, copper, iron, magnesium, potassium and sodium. Sulfur may be provided by means of sulfates, free sulfur, hyposulfite, persulfate, thiosulfate, methionine, cysteine, cystine, thiamine and biotin. Phosphorus can be provided from such sources as ortho-, meta-, or pyrophosphates, salts or esters thereof, glycerophosphate, corn steep liquor and casein. In addition, suspending or mycelial carriers, such as filter earths, filter aids, finely divided cellulose, woodchips, bentonite, calcium carbonate, magnesium carbonate, charcoal, activated carbon or other suspendable solid matter, methyl cellulose or carboxymethylcellulose, alginates, and the like, may be added to facilitate such unit processes and operations as fermentation, aeration and filtration.

Inoculation of the growth-supporting medium with *P. lilacinum* may be accomplished in any suitable manner. In general, the microorganisms employed in this invention may be grown over a temperature range of from about 15° C. to about 40° C., the preferred temperature range being approximately between 25–35° C.; moreover, it has been found that optimum conditions are usually obtained at about 28° C. As regards the temperature range employed during the period required for the fermentation of the medium, it may be substantially the same as that found suitable for the mycelial growth, i.e., it must be maintained only in the range that is necessary for the support of the organism's life and active growth as well as for its enzyme activity. The time period required for the fermentation step varies somewhat, depending upon the degree of vitamin $B_{12}$-activity desired to be imparted to the medium. In general, a time period of at least 24 hours is necessary in order to obtain a substantial degree of vitamin $B_{12}$-activity, the preferred range being from about one to about four days; needless to say, the process may be conducted for even longer periods of time in order to ensure completeness of reaction.

In connection with the fermentation step, it is to be noted that the efficiency of vitamin $B^{12}$-activity production is dependent upon the degree of aeration employed. The latter may be effected by either surface culture aerobic fermentation conditions or, and preferably, by submerged aerobic conditions. The latter is usually accomplished by blowing air through the fermentation medium which is simultaneously subjected to constant agitation. In general, a desirable rate of aeration is from about one-half to about two volumes of air per volume of fermentation medium per minute, although resort may be had to such modifications as the use of superatmospheric or subatmospheric pressure; for instance, pressures of 30 lbs. per sq. in. or 10 lbs. per sq. in., respectively, may also be employed.

After completion of the fermentation step, the vitamin $B_{12}$-active materials may be recovered from the whole broth, if so desired, by any number of methods well known to those having skill in this art [e.g., see K. J. Brunings et al. in U.S. 2,631,964 (1953), and E. N. Lightfoot, Jr., et al. in U.S. 2,787,578 (1957)]. For instance, a particularly advantageous method for recovering the products of this invention involves extraction of the fermentation broth by means of a suitable hydroxylated organic solvent such as n-butanol or benzyl alcohol, and thereafter subjecting said extract to the action of a suitable chromatographic column such as, for example, a column of activated alumina. Alternatively, the broth may be first adsorbed by means of a suitable agent such as activated charcoal or contacted with one of the various ion-exchange resins currently in use for such purposes. In either case, recovery of the vitamin $B_{12}$-active substance from the aforementioned adsorbate is then readily accomplished by means of elution with a suitable solvent system such as, for example, an aqueous solution of pyridine. Further purification of the product thus recovered can then be achieved, if so desired, by recrystallizing it from an appropriate solvent system, i.e., by first dissolving the product in a solvent in which vitamin $B_{12}$ is soluble, such as water, methanol, ethanol, and the like, and thereafter adding a sufficient amount of solvent in which vitamin $B_{12}$ is insoluble, such as acetone, for example, so as to induce crystallization of the pure material.

In accordance with a specific embodiment of the present invention, the vitamin $B_{12}$-activity producing microorganisms of the species *P. lilacinum* with which we are particularly concerned are grown on media containing assimilable carbon such as carbohydrates, assimilable nitrogen such as corn steep liquor and nitrates, together with mineral constituents such as phosphates and sulfates, in addition to sodium and potassium as well as trace amounts of cobalt. This medium may possess a pH in the range of from about 5.0 to about 8.0 before inoculation, although a slightly higher or lower pH may be satisfactorily employed; the preferred pH range for the growth of *P. lilacinum* is approximately pH 6.0–7.0.

In connection with the use of the vitamin $B_{12}$-active concentrates of this invention or with the various cobalamins isolated therefrom, it is to be noted that vitamin $B_{12}$ (cyanocobalamin) is indicated for the treatment of pernicious anemia, including the various neurological disorders and spinal cord degeneration conditions often associated with pernicious anemia. It has also been found to be effective in treating other macrocytic anemias, such as nutritional macrocytic anemias, tropical and non-tropical spruce and the megaloblastic anemia of infancy. Incidentally, when vitamin $B_{12}$ is administered orally rather than parenterally in the treatment of pernicious anemia, much larger doses are required. Furthermore, combinations of vitamin $B_{12}$ and folic acid have been found to be particularly effective via the oral route in the treatment of various macrocytic anemias. Moreover, the improved growth obtained by the oral administration of vitamin $B_{12}$ to children who are retarded in this respect indicates its value as a nutritional supplement; for these purposes, a daily requirement of approximately two to five micrograms is indicated if taken orally.

This invention is further illustrated by the following examples, which are not be considered as imposing any limitations on the scope thereof.

*Example I*

A culture of an organism identified as *Penicillium lilacinum* Thom was obtained from our culture collection where the isolate is identified under the code number 2258–165–2. A living culture of this organism has been deposited with the American Type Culture Collection in Washington, D.C., where it has been added to their permanent collection of microorganisms under the assigned number ATCC 13307. This organism was propagated on potato dextrose agar under controlled conditions at 28° C. in order to develop a slant culture of this strain for the purpose of inoculating a fermentation medium having the following composition:

| | Grams/liter |
|---|---|
| Corn steep liquor | 20.0 |
| Sucrose | 10.0 |
| Sodium nitrate | 2.0 |
| Dipotassium hydrogen phosphate | 1.0 |
| Potassium chloride | 0.5 |
| $MgSO_4 \cdot 7H_2O$ | 0.5 |
| $FeSO_4 \cdot 7H_2O$ | 0.01 |
| $CoCl_2 \cdot 6H_2O$ | 0.006 |

Distilled water, in sufficient amount for a 1000 ml. solution, adjusted to pH 7.0 with potassium hydroxide.

After the pH had been adjusted, the above medium was transferred to several 300 ml. Erlenmeyer flasks, each flask being filled with 100 ml. of this broth, and sterilized at 120° C. for fifteen minutes. After cooling to room temperature, the sterilized medium present in each flask was inoculated under aseptic conditions with a culture of the above *P. lilacinum*. The flasks containing the inoculated broth were then immersed in a constant temperature bath by attaching their necks to a rotary shaking machine. The contents of the flasks were then subjected to constant agitation and aeration at 27° C. for 48 hours in this manner. After completion of the fermentation step, paper chromatographic analysis of the fermented broth revealed the presence of a vitamin $B_{12}$-active substance (principally hydroxycobalamin); *L. leichmanii* assay indicated the $B_{12}$-activity to be about 0.2 γ/ml.

*Example II*

A culture of *P. lilacinum* ATCC 13307 was prepared as described in Example I for the purpose of inoculating a fermentation medium having the following composition:

| | Grams/liter |
|---|---|
| Soybean meal | 20.0 |
| Molasses | 10.0 |
| Sodium nitrate | 2.0 |
| Dipotassium hydrogen phosphate | 1.0 |
| Potassium chloride | 0.5 |
| $MgSO_4 \cdot 7H_2O$ | 0.5 |
| $FeSO_4 \cdot 7H_2O$ | 0.01 |
| $Co(NO_3)_2 \cdot 6H_2O$ | 0.006 |

Distilled water, in sufficient amount for a 1000 ml. solution, adjusted to pH 7.0 with potassium hydroxide.

After the pH had been adjusted, the above medium was subjected to the same procedure as that described in Example I except for the fact that the inoculated broth was agitated and aerated at 31° C. for 24 hours.

*Example III*

A culture of *P. lilacinum* ATCC 13307 was prepared and used for carrying out a fermentation exactly as described in Example I. The contents of the flask were then mixed and the total volume of fermented broth was subsequently filtered. The filtered broth was then acidified to pH 3 with phosphoric acid, filtered again and the resulting filtrate readjusted to about pH 7 with sodium hydroxide. The neutral filtered broth so obtained was then treated with 10 g. of activated charcoal and the resulting mixture was stirred for thirty minutes. The carbon adsorbate thus obtained was recovered from the broth by means of filtration and subsequently dried in a vacuum at 45° C. for 20 hours. The vitamin $B_{12}$-activity of the adsorbate was found to be substantially the same as that exhibited by the pretreated fermented broth.

*Example IV*

The procedure described in Example III was followed except that the carbon adsorbate recovered from the broth was twice eluted with aqueous ethanolic-pyridine (9:1:10 by volume) by suspending the adsorbate in this medium and stirring for thirty minutes and then repeating this step. The eluate obtained after each treatment was recovered from the carbon by means of filtration, and the resulting filtrates were combined and subsequently evaporated under reduced pressure, keeping the temperature below 35° C. The desired product was then isolated and dried from the frozen state to afford a cobalamin mixture exhibiting vitamin $B_{12}$-activity of substantially the same order of magnitude as that reported in Example III.

*Example V*

A *P. lilacinum* fermented broth obtained by the procedure described in Example I was adjusted to pH 2.5 with phosphoric acid and filtered. The resulting filtrate was then adjusted to pH 7.5 with sodium hydroxide and subsequently extracted with 100 ml. of cresol-carbon tetrachloride (2:3 by volume); the resulting water layer was then separated and re-extracted with 100 ml. of cresol-carbon tetrachloride (1:3 by volume). The two solvent extractions were then combined and twice extracted with 20 ml. of water. The combined aqueous solvent extracts so obtained were treated with 30 ml. of benzyl alcohol; the resulting aqueous layer was then saturated with ammonium sulfate and the alcoholic solvent layer was subsequently separated, followed by re-extraction of the aqueous layer with 10 ml. of the alcohol. The benzyl alcohol extracts were then combined and subsequently dried over anhydrous sodium sulfate, and the dried extracts so obtained were chromatographed on an activated alumina column. The adsorbate-containing column was then developed by washing it with a methanolic ethanol (1:2 by volume) solution. The adsorbate was then eluted from the alumina column by means of methanol and the desired product subsequently crystallized from the methanolic eluate. The crystalline material so isolated was dried in vacuo at 45° C. for 20 hours to afford a cobalamin mixture exhibiting vitamin $B_{12}$-activity of substantially the same order of magnitude as that reported in the previous examples; the red colored crystalline material consisting principally of hydroxycobalamin (vitamin $B_{12a}$), as revealed by optical density methods at 5500 A.

What is claimed is:

1. A process for producing cobalamins, which comprises fermenting an aqueous nutrient medium under submerged aerobic conditions by means of a microorganism of the species *Penicillium lilacinum* until a substantial degree of vitamin $B_{12}$-activity is imparted to said medium.

2. A process as claimed in claim 1 wherein the microorganism is *Penicillium lilacinum* ATCC 13307.

3. A process for producing cobalamins, which comprises fermenting an aqueous nutrient medium under submerged aerobic conditions by means of a microorganism of the species *Penicillium lilacinum* at a temperature that is in the range of from about 15° C. to about 40° C. for a period of about one to about four days.

4. A process for producing cobalamins, which comprises fermenting an aqueous nutrient medium under submerged aerobic conditions by means of a microorganism of the species *Penicillium lilacinum* and thereafter recovering from the fermentation broth the cobalamins thus produced.

5. A process as claimed in claim 4 wherein the cobalamins thus produced comprise hydroxycobalamin as their principal active ingredient.

(References on following page)

References Cited in the file of this patent

UNITED STATES PATENTS 2,595,499    Wood et al. -------------- May 6, 1952

OTHER REFERENCES

Hall et al.: A Survey of Vitamin $B_{12}$-Producing Microorganisms, Bact. Proc. Abst., 50th Meeting: 1950, page 21.

Darken, Marjorie: "Production of Vitamin $B_{12}$ by Microorganisms and its Occurrence in Plant Tissues," The Botanical Review, vol. XIX, No. 2, February 1953, pages 99–130.